United States Patent [19]

Schulze et al.

[11] 3,922,919
[45] Dec. 2, 1975

[54] PRESSURE GAUGE

[75] Inventors: William Carl Schulze, Hatboro; Ralph D. Waite, Sellersville, both of Pa.

[73] Assignee: Ametek, Inc., New York, N.Y.

[22] Filed: Feb. 14, 1974

[21] Appl. No.: 442,469

Related U.S. Application Data

[63] Continuation of Ser. No. 208,647, Dec. 16, 1971, abandoned.

[52] U.S. Cl. .................. 73/418; 29/458; 73/431; 285/173
[51] Int. Cl.² ............................................. G01L 7/04
[58] Field of Search ............ 73/416, 420, 431, 273; 116/114 S; 169/131; 29/458, 52.5; 285/173

[56] References Cited
UNITED STATES PATENTS

| | | | |
|---|---|---|---|
| 1,986,852 | 1/1935 | Potter | 73/273 |
| 2,823,933 | 2/1958 | Hickman et al. | 285/173 |
| 3,096,654 | 7/1963 | DuBois | 73/431 |
| 3,152,480 | 10/1964 | Hoff, Jr. | 73/431 |
| 3,222,933 | 12/1965 | Howard | 73/418 |
| 3,357,394 | 12/1967 | Ingham et al. | 73/431 |
| 3,543,586 | 11/1968 | Waite | 73/420 X |
| 3,803,918 | 4/1974 | Blough, Jr. | 116/114 S |

*Primary Examiner*—Richard C. Queisser
*Assistant Examiner*—Daniel M. Yasich
*Attorney, Agent, or Firm*—Smythe & Moore

[57] ABSTRACT

A pressure gauge having a one-piece aluminum casing with an open end closed by a transparent cover plate whose open end is provided with an enlarged lip which is crimped in a groove in the open end of the casing. There is a bore to the back plate of the casing and a brass socket has one end tightly received within the bore and is sealed therein with an adhesive such as an anaerobic adhesive. The bore passes through a tubular projection extending outwardly of the casing back plate and this tubular projection which is integral with the casing, is connected directly to a pressure port.

4 Claims, 5 Drawing Figures

INVENTORS
WILLIAM CARL SCHULZE
RALPH D. WAITE
BY
Smythe & Moore
ATTORNEYS

PRESSURE GAUGE

This is a continuation of application Ser. No. 208,647, filed Dec. 16, 1971, now abandoned.

The present invention relates to pressure gauges and particularly to such a gauge having an aluminum connection for casing to a pressure port.

Many pressure vessels are fabricated from aluminum since their light weight and high strength characteristics are suitable for such an application. Fire extinguishers, for example, are usually provided with pressure gauges attached to the valve housing thereof to indicate the charging pressure of the fire extinguisher. As long as the charging pressure remains within a certain predetermined range, the fire extinguisher will be operable. However, difficulties have been encountered in mounting such gauges on aluminum fire extinguishers since the gauges are generally provided with brass or bronze tubular projection resulting in severe corrosion of the aluminum valve housing due to galvanic action. The obvious solution is to provide the gauge with an aluminum pressure casting. However, it is difficult to join the bronze Bourdon tube to the aluminum casting by conventional means such as soldering. Further, fire extinguishers are frequently used in marine applications requiring that the gauges be watertight and resistant to salt spray. Present designs of fire extinguisher gauges are subject to case leakage at the joints between the transparent cover and the case and at the joint between the case and the pressure casting. Improvement or elimination of these joints is therefore highly desirable.

One of the objects of the present invention is to provide an improved pressure gauge construction.

Another of the objects of the invention is to provide a pressure gauge having an aluminum casting to facilitate mounting of the gauge to aluminum pressure vessels.

Another of the objects of the invention is to provide an improved but simplified construction of a pressure gauge.

According to one aspect of the present invention, a pressure gauge having an aluminum or similar metal housing may comprise a one-piece casing of aluminum having a cylindrical side wall connected at one end thereof to a back plate. A tubular projection extends outwardly from the outer face of the back plate and a transparent cover having a cylindrical side wall and a front face connected to an end of the side wall is crimped into the outer end of the cover side wall to form a cover and casing assembly. There is a bore through the back plate and projection to provide a passage from the interior of the casing and cover assembly. The casing comprising the cylindrical side wall, back plate, and tubular projection are of a unitary construction. A socket of a dissimilar material other than aluminum, such as brass, has one end snugly received within the bore and the other end projects into the casing and cover assembly. In one form, the one end of the socket within the bore may terminate short of the end of the tubular projection. The term "socket" means a connection to a part of the gauge movement. Preferably, an anaerobic adhesive can be applied between the socket and the bore to sealingly retain the socket therein. Preferably, an anaerobic adhesive is an adhesive that remains liquid or viscous when exposed to atmosphere but will solidify or polymerize when air or oxygen is cut off thereto. Examples of anaerobic adhesive can be found in U.S. Pat. Nos. 2,895,950; 3,218,305; 3,300,547 and others. It is of single component polyester type resins furnished as liquids which self-harden into tough plastic bonds when confined between close fitting metal parts. One example is that sold under the designation "Loctite 75" by Loctite Corporation. Such has a shear strength of 2000 to 5000 psi; temperature range of 65° to 300° F. and viscosity 100 to 500 cp. Other suitable adhesives can be used.

These and other objects, advantages and features of the invention will become apparent from the following description and drawings which are merely exemplary.

In the drawings.

Proceeding next to the drawings wherein like reference symbols indicate the same parts throughout the various views, a specific embodiment of the present invention will be described in detail.

Figure 1:
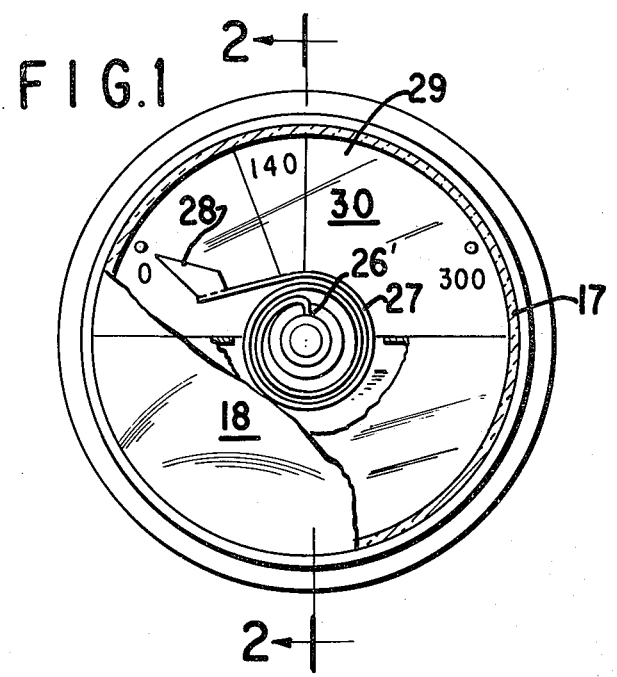
FIG. 1 is a front elevational view of a pressure gauge according to the present invention with a portion of the cover plate cut away.
Figure 2:
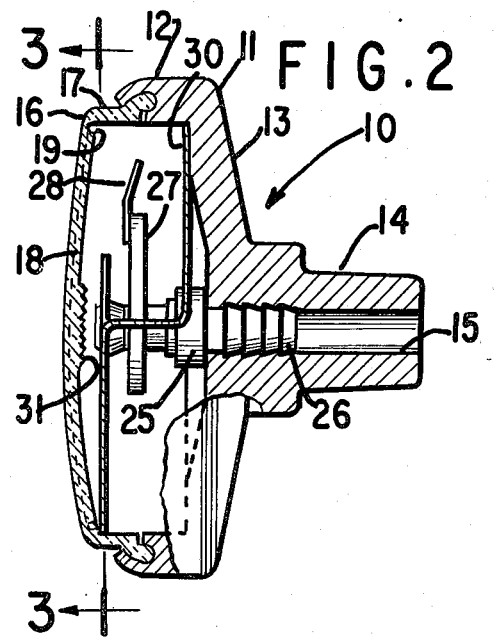
FIG. 2 is a sectional view taken along the line 2—2 of FIG. 1.
Figure 3:
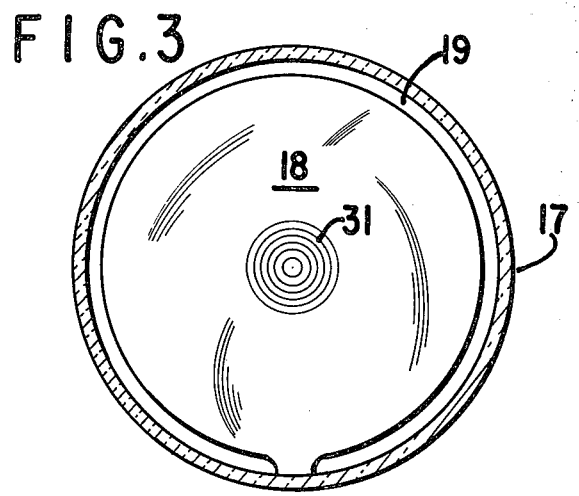
FIG. 3 is a sectional view taken along the line 3—3 of FIG. 2.

In FIGS. 1 and 2 there is shown a pressure gauge indicated generally at 10 and comprising a casing 11 having a cylindrical side wall 12 with a back plate 13 being connected to and integral with one end of the side wall. Extending outwardly from the outer face of the back plate is a tubular projection 14 which also is integral with the back plate. Thus, the side wall 12, the back plate 13, and the projection 14 form a single unitary structure.

A bore 15 passes through the back plate 13 and the projection 14. The entire casing 11 can be made of aluminum.

The open end of casing 11 is closed by a window or cover plate 16 which is transparent and formed of a suitable plastic material, such as "Tenite," a trademark of Eastman Chemical Products, Inc., its brand of butyrate molding and extrusion compounds. Another plastic material suitable for the purpose is "Lexan," a trademark of General Electric Co., for its brand of polycarbonate. The cover 16 comprises a cylindrical side wall 17 and a front face 18 connected to and integral with one end of the side wall. At the juncture of the front plate and side wall, there may be provided an annular undercut 19 which may be so shaped so as to produce a section which will fracture upon a predetermined internal pressure so as to permit the front face portion of the cover or window to blow out.

Figure 4:
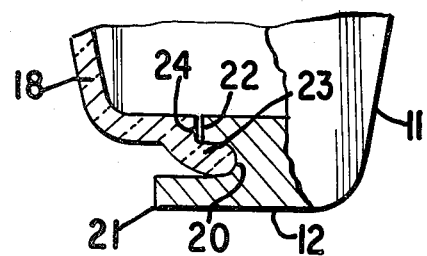
FIG. 4 is a portion of the sectional view of FIG. 2 before crimping of the cover plate into the casing.

The open edge of the casing side wall 12 is provided with a groove 20 with the outer edge 21 thereof being longer than the inner edge 22. The groove 20 is curved to conform to the shape of an enlarged axially extending lip 23 formed on the open end of the cover plate side wall 17. There is an inner notch 24 inwardly of the lip 23 with this notch receiving the inner end 22 of the groove as may be best seen in FIGS. 4 and 5.

Figure 5:
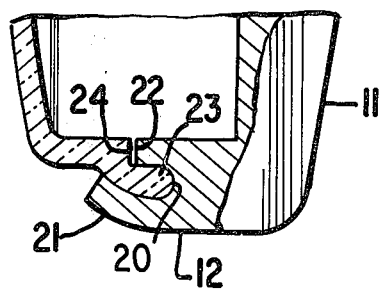
FIG. 5 is a veiw similar to that of FIG. 4 but after crimping.

Upon assembly of the lip 23 within the groove 20, the outer edge 21 is crimped over as shown in FIG. 5 to securely retain the cover plate onto the casing.

A socket 25, which may be made of brass, has one or more annular barbs or serrations 26 formed on one end thereof, the barbed end thereof being inserted within the bore 15 as shown in FIG. 2. Barbed-type sockets are illustrated in U.S. Pat. Nos. 3,530,724 and 3,543,586.

Prior to insertion into the bore, the barbed end may be coated with a suitable retaining compound which may be an anaerobic adhesive such as disclosed in U.S. Pat. No. 2,895,950 or in U.S. Pat. No. 3,203,941. Other adhesives can be used.

On the other end of the socket 25 there is formed an elongated slot 26' to which is soldered one end of a Bourdon spring 27. A pointer 28 is mounted on the other end of the Bourdon spring and this pointer moves over a suitably calibrated scale 29 on a dial face 30.

The inner face of the cover plate may be provided with a series of concentric ribs 31 or other suitable design to shield the Bourdon spring from view.

The socket 25 may also be of any suitable metal, but it is generally of a metal dissimilar from that of the aluminum casing, and capable of being joined to the Bourdon as by soldering.

Thus, it can be seen that the present invention has disclosed a pressure gauge having an aluminum housing with the gauge having a one-piece casing to which a cover plate is tightly secured by a crimping of the outer edge of the casing over an enlarged lip on the end of the cover plate. Further, a tightly locking retaining compound in the form of an adhesive, such as an anaerobic adhesive is applied between the socket and the bore. The result is a gauge which is simple and inexpensive in construction and which greatly facilitates its mounting on aluminum pressure vessels not shown. It is particularly useful in conjunction with fire extinguishers having aluminum casings. The concept of the invention can be applied to other instances of dissimilar materials.

It will be understood that various details of construction and arrangement of parts may be made without departing from the spirit of the invention except as defined in the appended claims.

What is claimed is:

1. A pressure gauge for connection to an aluminum pressure vessel, said gauge including a pressure responsive indicator movement operably arranged therein, said gauge having an aluminum housing comprising a one-piece casing of aluminum having a cylindrical side wall connected at its inner end to a back plate, a tubular projection extending outwardly from the outer face of said back plate and integral therewith, a transparent window having a peripheral side wall and a front viewing face, said window side wall being mounted and held in the outer end of said casing side wall, there being a bore through said back plate and projection to provide a passage from the interior of the casing and window, a socket of a metal, said metal being one which is capable of corrosion when in galvanic association with aluminum, said socket having one end serrated and coated with adhesive and snugly and intimately received and retained within said bore and the other end projecting into the casing and window assembly, said metal being such that a Bourdon tube can be readily soldered thereto, and a Bourdon tube soldered to said socket, whereby the aluminum casing can be connected to an aluminum pressure vessel without corrosion occurring between the tubular projection and pressure vessel, the socket being exposed to the interior of the pressure vessel only through said bore.

2. A pressure gauge as claimed in claim 1 wherein the outer end of the side wall has a groove therein for receiving the window, the outer edge of the groove extending beyond the inner edge of the groove and being crimped over the other end of said side wall.

3. A pressure gauge as claimed in claim 2 wherein said socket is of brass.

4. A pressure gauge as claimed in claim 2 wherein the adhesive is anaerobic.

* * * * *

UNITED STATES PATENT OFFICE
CERTIFICATE OF CORRECTION

PATENT NO. : 3,922,919
DATED : December 2, 1975
INVENTOR(S) : William Carl Schulze and Ralph D. Waite It is certified that error appears in the above—identified patent and that said Letters Patent are hereby corrected as shown below:

Column 1, lines 5 and 6, "connection" should be --casing--;
Column 1, line 29, "casting" should be --socket--; Column 1,
line 35, "casting" should be --casing--.

Signed and Sealed this fourth Day of May 1976

[SEAL]

Attest:

RUTH C. MASON
Attesting Officer

C. MARSHALL DANN
Commissioner of Patents and Trademarks